United States Patent
Friedman

[19]

[11] Patent Number: 5,826,026
[45] Date of Patent: Oct. 20, 1998

[54] INTERNET MESSAGE COMMUNICATOR WITH DIRECT OUTPUT TO A HARD COPY DEVICE

[75] Inventor: Amir Friedman, Hod Hasharon, Israel

[73] Assignee: Connect-One, Ltd., Hod Hasharon, Israel

[21] Appl. No.: 555,617

[22] Filed: Nov. 9, 1995

[51] Int. Cl.⁶ .................................................. G06F 13/00
[52] U.S. Cl. ............................... 395/200.47; 395/200.36; 395/200.49; 379/96; 379/100
[58] Field of Search ......................... 395/200.03, 200.48, 395/200.47, 200.5, 200.8, 680, 681, 285, 527, 326, 200.49, 200.36; 379/65, 67, 69, 70, 90, 92, 96, 97, 89, 100

[56] References Cited

U.S. PATENT DOCUMENTS

| | | | |
|---|---|---|---|
| 4,935,954 | 6/1990 | Thompson et al. | 379/89 |
| 5,161,180 | 11/1992 | Chavous | 379/45 |
| 5,201,067 | 4/1993 | Grunbe et al. | 455/89 |
| 5,220,501 | 6/1993 | Lawlor et al. | 380/24 |
| 5,323,450 | 6/1994 | Goldhagen et al. | 379/100 |
| 5,327,487 | 7/1994 | Brown et al. | 379/100 |
| 5,333,266 | 7/1994 | Boaz et al. | 395/200.01 |
| 5,602,905 | 2/1997 | Mettke | 379/96 |
| 5,610,910 | 3/1997 | Focsaneanu et al. | 370/351 |

FOREIGN PATENT DOCUMENTS

95/06384  3/1995  WIPO.

*Primary Examiner*—Parshotam S. Lall
*Assistant Examiner*—Viet Vu
*Attorney, Agent, or Firm*—Abelman, Frayne & Schwab

[57] ABSTRACT

This invention discloses an apparatus for a global network communicator including an application-specific communications device suitable substantially only for global network communications and including a global network application specific user interface, network protocol processing circuitry operative for communication with the global network and for formatting data to a required protocol employed by the global network and for translating data received from the global network to a format acceptable to the user interface, a communication line interface interconnecting the network protocol processing circuitry to the global network and including logical and physical interface apparatus and modulation and demodulation apparatus for information transmitted to the global network and information received from the global network respectively and network access activation circuitry for initiating communication between the communicator and the global network.

19 Claims, 8 Drawing Sheets

INTERNET MESSAGE COMMUNICATOR WITH DIRECT OUTPUT TO A HARD COPY DEVICE

FIELD OF THE INVENTION

The present invention relates to communicators specifically configured for global network applications.

BACKGROUND OF THE INVENTION

In recent years, personal computers have become common fixtures in many offices and homes. With the advent of widespread consumer access to the Internet and other global networks, the personal computer has become inter alia a communicator.

Nevertheless, there remains a substantial portion of the general population which could benefit from access to the Internet and which does not have access to a personal computer or for whom the use of a personal computer is not convenient or necessary.

SUMMARY OF THE INVENTION

The present invention seeks to provide a global network communicator which avoids limitations inherent in general purpose computers useful inter alia for this purpose.

There is thus provided in accordance with a preferred embodiment of the present invention a global network communicator including an application-specific communications device suitable substantially only for global network communications and comprising:

a global network application specific user interface;

network protocol processing circuitry operative for communication with the global network and for formatting data to a required protocol employed by the global network and for translating data received from the global network to a format acceptable to the user interface;

a communication line interface interconnecting the network protocol processing circuitry to the global network and including logical and physical interface apparatus; and network access activation circuitry for initiating communication between the communicator and the global network.

In accordance with a preferred embodiment of the present invention, the communication line interface may include modulation and demodulation apparatus for information transmitted to the global network and information received from the global network respectively.

The term "global network" as used herein is intended to refer to networks such as Internet, Compuserve and the like and to similar networks which may come into existence in the future.

In accordance with a preferred embodiment of the present invention, the global network communicator may comprise apparatus for automatically operating the network access activation circuitry at predetermined times.

There is also provided in accordance with a preferred embodiment of the present invention an automatic dedicated network communications downloader comprising:

communications circuitry including a network port arranged to be coupled to a network and a hard copy output port arranged to be coupled to a hard copy output device, the communications circuitry including:

polling apparatus for automatically polling a network via the network port to determine the presence of an incoming message for a user, and output apparatus for automatically downloading an incoming message and outputting the incoming message via the hard copy output port to the hard copy output device.

There is also provided in accordance with a preferred embodiment of the present invention a communications system comprising:

a network having a plurality of user ports;

a plurality of user stations; and a hard copy output device;

at least one of the plurality of user stations comprising an automatic dedicated network communications downloader comprising:

communications circuitry including a network port arranged to be coupled to the network via a user port and a hard copy output port arranged to be coupled to the hard copy output device, the communications circuitry including:

polling apparatus for automatically polling a network via the network port to determine the presence of an incoming message for a user, and output apparatus for automatically downloading an incoming message and outputting the incoming message via the hard copy output port to the hard copy output device.

There is additionally provided in accordance with a preferred embodiment of the present invention an automatic dedicated network communications downloading method comprising:

providing communications circuitry including a network port arranged to be coupled to a network and a hard copy output port arranged to be coupled to a hard copy output device;

automatically polling a network via the network port to determine the presence of an incoming message for a user, and automatically downloading an incoming message and outputting the incoming message via the hard copy output port to the hard copy output device.

There is also provided in accordance with a preferred embodiment of the present invention a communications method comprising:

providing a network having a plurality of user ports;

providing a plurality of user stations at least one of which having associated therewith a hard copy output device and an automatic dedicated network communications downloader comprising communications circuitry including a network port arranged to be coupled to the network via a user port and a hard copy output port arranged to be coupled to the hard copy output device;

automatically polling a network via the network port to determine the presence of an incoming message for a user, and automatically downloading an incoming message and outputting the incoming message via the hard copy output port to the hard copy output device.

In accordance with a preferred embodiment of the present invention the automatic polling includes establishing communication with the network via a predetermined service provider.

There is further provided in accordance with a preferred embodiment of the present invention a communications system comprising:

a network having a plurality of user ports; and a facsimile machine connected to one of the plurality of user ports, an automatic dedicated network communications downloader associated with the facsimile machine and comprising:

communications circuitry including a network port arranged to be coupled to the network via the user port connected to the facsimile machine and a hard copy output port coupled to the facsimile machine, the communications circuitry including output apparatus for automatically downloading an incoming message and outputting the incoming message via the hard copy output port to the facsimile machine.

In accordance with a preferred embodiment of the present invention, the downloader may also include polling apparatus for automatically polling a network via the network port to determine the presence of an incoming message for a user.

There is additionally provided in accordance with a preferred embodiment of the present invention an automatic dedicated network communications downloading method comprising:

providing communications circuitry including a network port arranged to be coupled to a network and via a user port connected to a facsimile machine and a hard copy output port coupled to the facsimile machine; and automatically downloading an incoming message and outputting the incoming message via the hard copy output port to the facsimile machine.

The method may also include the step of automatically polling a network via the network port to determine the presence of an incoming message for a user.

There is also provided in accordance with a preferred embodiment of the present invention a communications method comprising:

providing a network having a plurality of user ports;

providing a plurality of user stations at least one of which having associated therewith a facsimile machine and an automatic dedicated network communications downloader comprising communications circuitry including a network port coupled to the network via a user port and a hard copy output port coupled to the facsimile machine; and automatically downloading an incoming message and outputting the incoming message via the hard copy output port to the facsimile machine.

The method may also include automatically polling a network via the network port to determine the presence of an incoming message for a user.

In accordance with a preferred embodiment of the present invention the automatic polling includes establishing communication with the network via a predetermined service provider.

There is additionally provided in accordance with a preferred embodiment of the present invention a combination global network communicator and facsimile machine comprising:

a facsimile machine adapted to be connected to a telephone network via a telephone line including:
a hard copy output device; and
an automatic dedicated network communications downloader associated with the hard copy output device and comprising:
communications circuitry including a network port arranged to be coupled to a network via the telephone line connected to the facsimile machine and a hard copy output port coupled to the hard copy output device, the communications circuitry including output apparatus for automatically downloading an incoming message received from the network and outputting the incoming message via the hard copy output port to the hard copy output device.

In accordance with a preferred embodiment of the present invention, the downloader may also include polling apparatus for automatically polling the network via the network port to determine the presence of an incoming message for a user.

There is additionally provided in accordance with a preferred embodiment of the present invention apparatus for automatic electronic data entry via a global network comprising:

an application-specific communications device suitable substantially only for global network communications and comprising:
a global network application specific user interface;
network protocol processing circuitry operative for communication with the global network and for automatically formatting data to a required protocol employed by the global network and for automatically translating data received from the global network to a format acceptable to the user interface;
a communication line interface interconnecting the network protocol processing circuitry to the global network and including logical and physical interface apparatus and modulation and demodulation apparatus for information transmitted to the global network and information received from the global network respectively; and
network access activation circuitry for initiating communication between the communicator and the global network.

There is also provided in accordance with a preferred embodiment of the present invention apparatus for dedicated off-line communication of voice messages over a global network comprising:

an application-specific communications device suitable substantially only for global network communications and comprising:
a global network application specific user interface including a voice transducer;
a voice-data converter for converting between analog voice and digital data representing voice;
network protocol processing circuitry operative for communication with the global network and for automatically formatting digital data representing voice from the voice-data converter to a required protocol employed by the global network and for automatically translating digital data representing voice received from the global network to a format acceptable to the voice-data converter;
a communication line interface interconnecting the network protocol processing circuitry to the global network and including logical and physical interface apparatus and modulation and demodulation apparatus for information transmitted to the global network and information received from the global network respectively; and
network access activation circuitry for initiating communication between the communicator and the global network.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
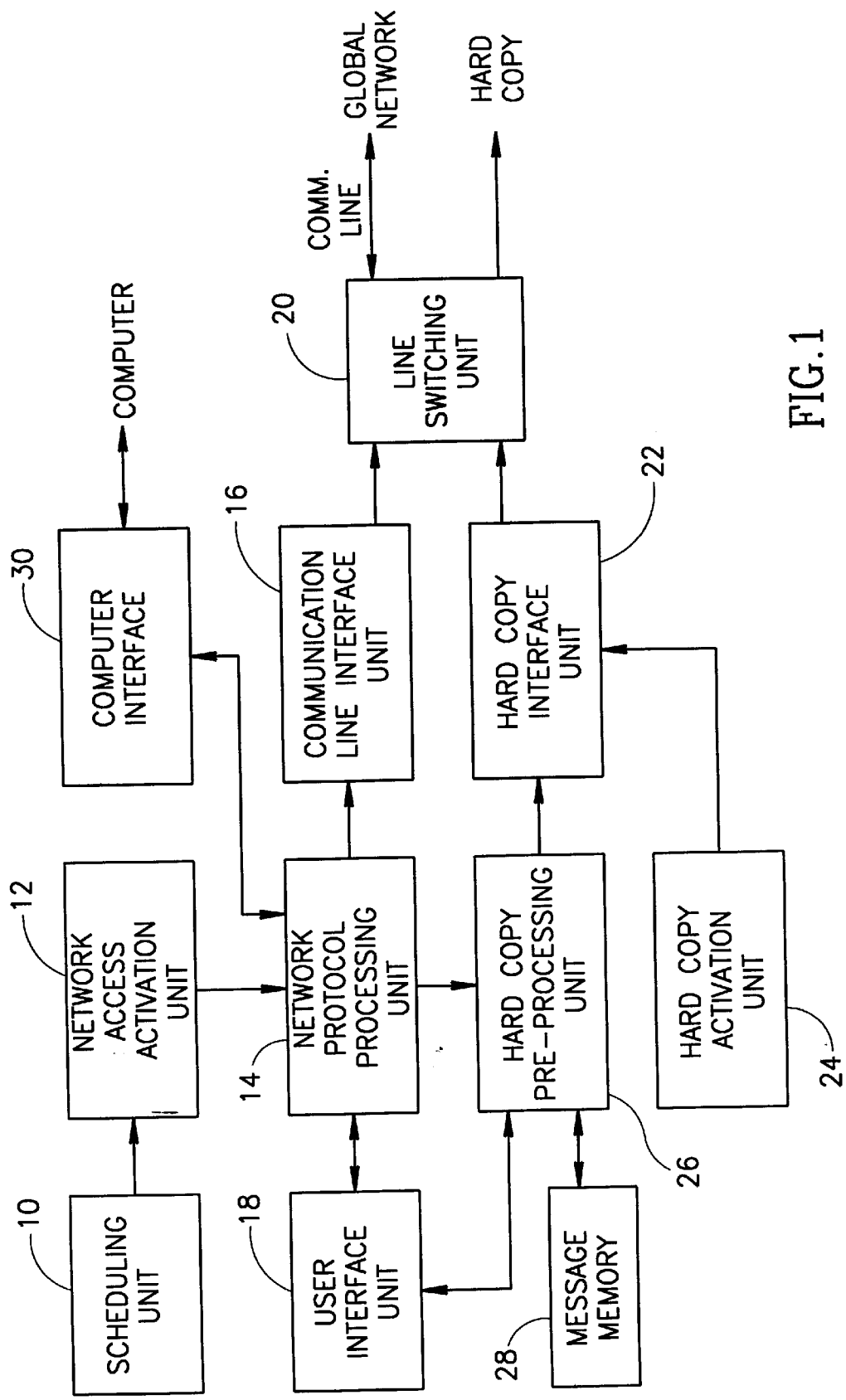
FIG. 1 is a simplified block diagram illustration of an automatic dedicated network communications downloader constructed and operative in accordance with a preferred embodiment of the present invention.

Reference is now made to FIG. 1, which is a simplified block diagram illustration of an automatic dedicated network communications downloader constructed and operative in accordance with a preferred embodiment of the present invention. The communications downloader preferably comprises a scheduling unit 10, which activates a network access activation unit 12 at predetermined times or with a predetermined frequency. The downloader of FIG. 1 may also have an uploading functionality.

The network access activation unit 12 includes apparatus required to activate or initiate a connection to a global network. This apparatus typically includes an automatic dialer and login device. The scheduling unit 10 typically includes a clock which activates the operation of activation unit 12.

The network access activation unit 12 typically actuates a network protocol processing unit 14 which is responsible for communications with the global network. The network protocol processing unit 14 typically is operative to format data to be sent along the network into the required network protocol and to translate received data into a format useful ultimately by a user in hardcopy form.

Network protocol processing unit 14 interfaces with a communication line interface unit 16, which preferably provides the logical and physical interface to an external communication line. It preferably includes a modulator for modulating signals being transmitted along the communication line and a demodulator for demodulating signals received along the communication line.

Network protocol processing unit 14 also preferably interfaces with a user interface unit 18, which is operative to input user commands. The user interface unit 18 may include a complete keyboard and alphanumeric display but may be as simple as a single push button and a single display element.

Communication line interface unit 16 preferably communicates with an external communication line via a line switching unit 20, which is also coupled to a hard copy output device, such as a printer. The line switching unit 20 connects the downloader either to the global network or to the hard copy device depending on the current mode of its operation. Typically the scheduling unit 10 determines network polling times during which the line switching unit 20 couples the communication line interface unit 16 to the global network via the external communication line. When hard copy printing is required, the line switching unit 20 connects a hard copy output device to a hard copy interface unit 22. Alternatively, the line switching unit 20 may be eliminated in favor of permanent connections to both the external communication line and the hard copy output device.

The hard copy interface unit 22 is operative to provide logical and physical interface to the hard copy output device, including all necessary hand-shaking and hardcopy device protocol management. Hard copy interface unit 22 receives an activation input from a hardcopy activation unit 24 and an information input from a hard copy pre-processing unit 26, which may interface with a memory 28, which may include a system program and database as well as messages to be sent and/or received messages. Memory 28 is preferably a non-volatile, rewritable memory.

Hard copy pre-processing unit 26 may also receive information to be output directly from the network protocol processing unit 14 or via the user interface unit 18.

In accordance with a preferred embodiment of the present invention, network protocol processing unit 14 may be coupled to a computer interface 30, such as an RS 232 interface which enables interconnection with a general purpose computer, such as a personal computer (not shown), for the purpose of uploading or downloading information respectively to or from the general purpose computer.

It is a particular feature of the present invention that the downloader of the present invention requires substantially no computer literacy on the part of the user and may be entirely automatic and unattended in its operation. The simplicity and low cost of the downloader provide utility for global network message download whether or not general purpose computer facilities are available.

Figure 2:
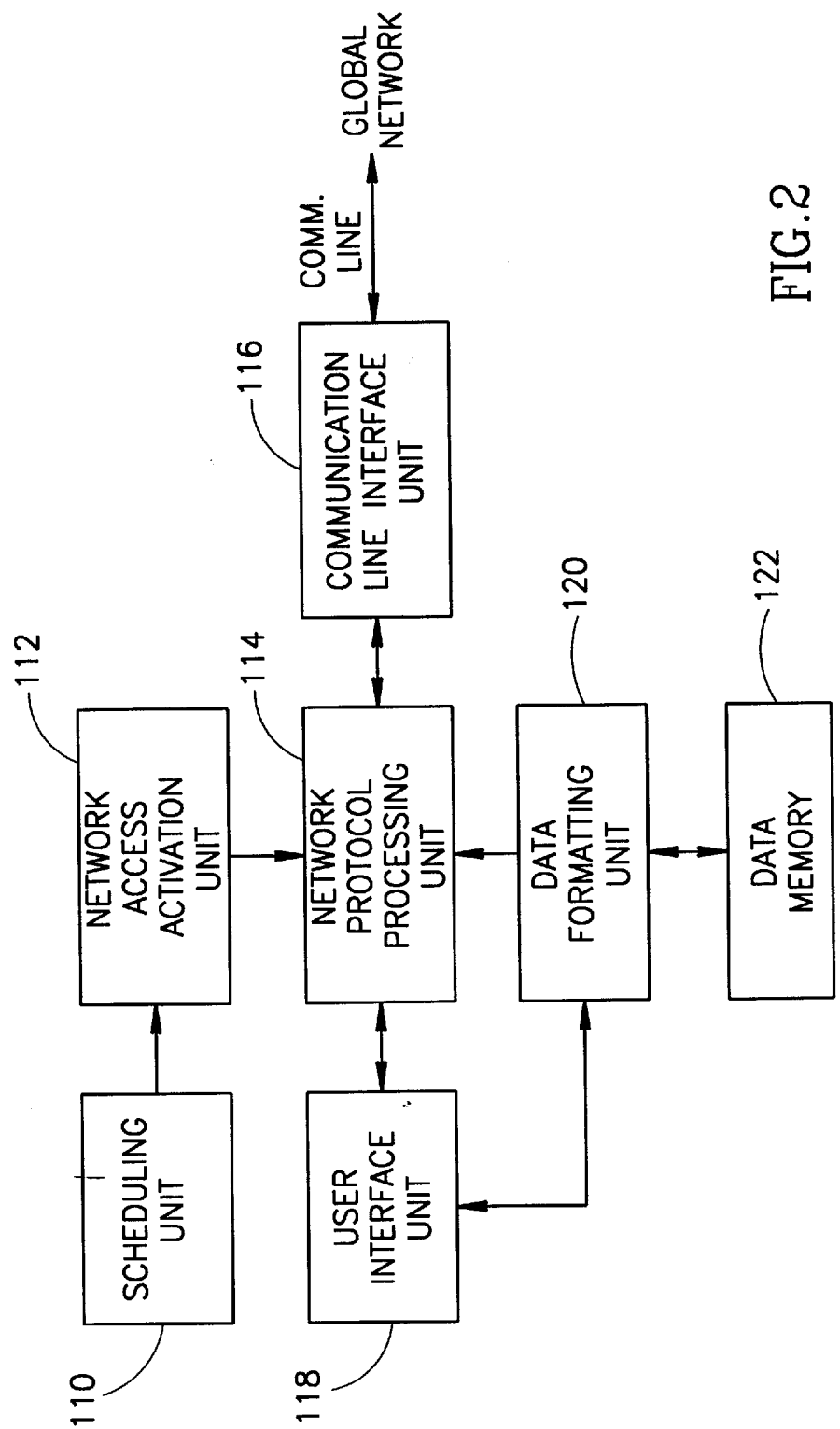
FIG. 2 is a simplified block diagram illustration of an automatic dedicated data entry device for use with a global network which constructed and operative in accordance with a preferred embodiment of the present invention.

Reference is now made to FIG. 2, which is a simplified block diagram illustration of an automatic dedicated data entry device for use with a global network which is constructed and operative in accordance with a preferred embodiment of the present invention. The communications downloader preferably comprises a scheduling unit 110, which activates a network access activation unit 112 at predetermined times or with a predetermined frequency.

The network access activation unit 112 includes apparatus required to activate or initiate a connection to a global network. This apparatus typically includes an automatic dialer and login device. The scheduling unit 110 typically includes a clock which activates the operation of activation unit 112.

The network access activation unit 112 typical actuates a network protocol processing unit 114 which is responsible for communications with the global network. The network protocol processing unit 114 is operative to format data to be sent along the network into the required network protocol and to translate received data into a format useful ultimately by a user.

Network protocol processing unit 114 interfaces with a communication line interface unit 116, which preferably provides the logical and physical interface to an external communication line. It preferably includes a modulator for modulating signals being transmitted along the communication line and a demodulator for demodulating signals received along the communication line.

Network protocol processing unit 114 also preferably interfaces with a user interface unit 118, which is operative to input user commands. The user interface unit 118 may include complete keyboard and alphanumeric display but may be as simple as a single push button and a single display element.

User interface unit 118 and network protocol processing unit 114 interface with a data formatting unit 120 which is operative to format data to be sent along the global network into the exact format required by a recipient on the network. This enables the recipient to automatically enter the received data into an electronic database and automatically to send messages back to the user via the device. Data formatting unit 120 is preferably also operative to unformat or reformat data or other messages received along the network from a transmitter into the format which is compatible with user interface unit 118, so as to eliminate the need for user manipulation of the data.

Data formatting unit 120 may interface with a data memory 122, which may include a system program and database as well as messages to be sent and/or received messages. Memory 28 is preferably a non-volatile, rewritable memory.

Figure 3:
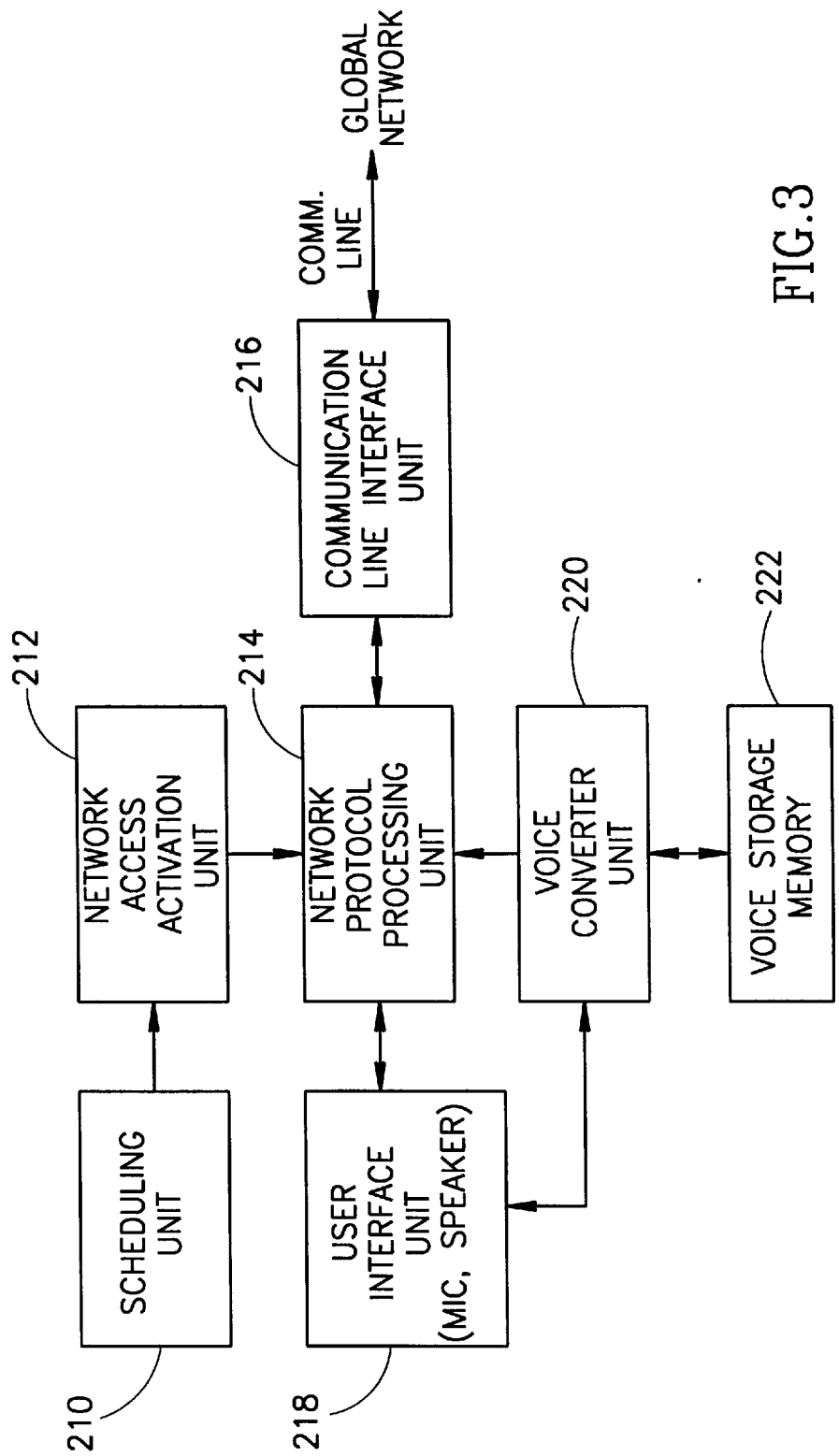
FIG. 3 is a simplified block diagram illustration of an off-line voice message communicator constructed and operative in accordance with a preferred embodiment of the present invention.

Reference is now made to FIG. 3, which is a simplified block diagram illustration of an off-line voice message communicator constructed and operative in accordance with a preferred embodiment of the present invention.

The off-line voice message communicator preferably comprises a scheduling unit 210, which activates a network access activation unit 212 at predetermined times or with a predetermined frequency.

The network access activation unit 212 includes apparatus required to activate or initiate a connection to a global network. This apparatus typically includes an automatic dialer and login device. The scheduling unit 210 typically includes a clock which activates the operation of activation unit 212.

The network access activation unit 212 typically actuates a network protocol processing unit 214 which is responsible for communications with the global network. The network protocol processing unit 214 is operative to format data to be sent along the network into the required network protocol and to translate received data into a format useful ultimately by a user.

Network protocol processing unit 214 interfaces with a communication line interface unit 216, which preferably provides the logical and physical interface to an external communication line. It preferably includes a modulator for modulating signals being transmitted along the communication line and a demodulator for demodulating signals received along the communication line.

Network protocol processing unit 214 also preferably interfaces with a user interface unit 218, which is operative to input user commands. The user interface unit 118 may include a complete keyboard and alphanumeric display but may be as simple as a single push button and a single display element. The user interface unit 218 includes at least one audio transducer, such as a speaker/microphone.

User interface unit 218 and network protocol processing unit 214 interface with a voice converter unit 220 which is operative to convert analog signals from the microphone in the user interface unit 218 into digital form for storage in a voice storage memory 222. Unit 220 is also operative to convert digital data stored in memory 222 or received over the communication line into analog signals to drive a speaker in the user interface unit 218. This digital data may be voice data or alternatively text data which is converted by the voice converter unit 220 into voice data. Unit 220 also is operative to format digital data corresponding to voice input at user interface unit 218 to the proper format required for transferring the voice data along the global network.

Figure 4:
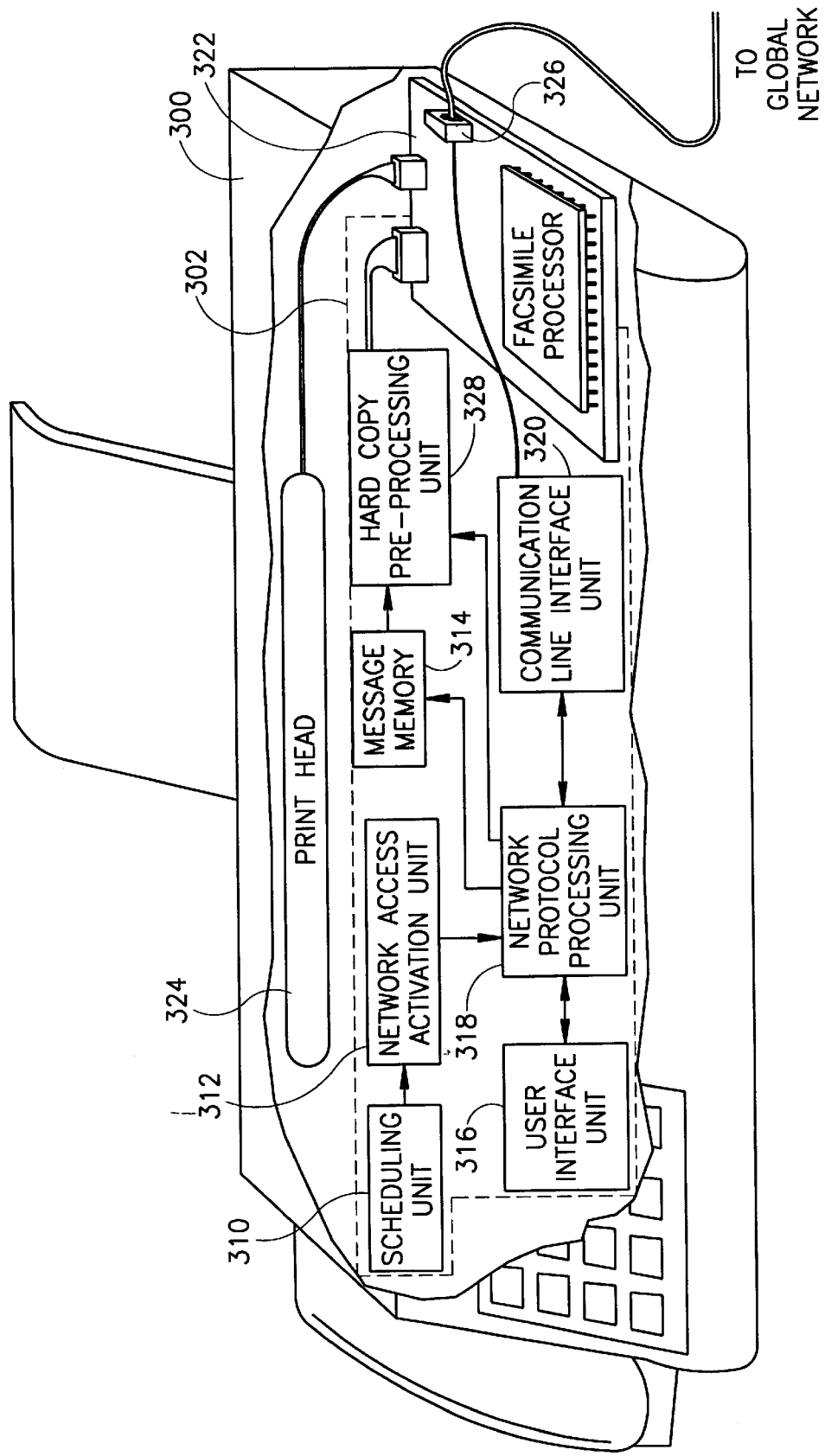
FIG. 4 is a simplified partially pictorial, partially block diagram illustration of a facsimile machine incorporating a network downloader subsystem in accordance with a preferred embodiment of the present invention.

Reference is now made to FIG. 4, which is a simplified block diagram of a facsimile and network downloader system constructed and operative in accordance with a preferred embodiment of the present invention. The system of FIG. 4 is preferably located within the housing 300 of a conventional fax machine, such as those manufactured and sold by Ricoh of Japan. Some of the circuitry of FIG. 1, collectively referred to as an automatic download circuit 302, is included within housing 300. Automatic download circuit typically includes a scheduling unit 310, a network access activation unit 312, a message memory 314, a user interface 316, a network protocol processing unit 318 and a communication line interface unit 320, whose functionality is similar to that described hereinabove in connection with FIG. 1 and is suitable for operation in the context of an otherwise conventional facsimile machine.

The hard copy output of the hard copy pre-processing unit 328 is preferably coupled to a facsimile processor board 322 of the facsimile machine, which couples it to a print head 324 of the facsimile machine. The global network output of unit 320 may be connected in parallel with the conventional connection of the facsimile machine to a telephone line, via a conventional telephone line jack 326, forming part of the facsimile machine.

Figure 5:
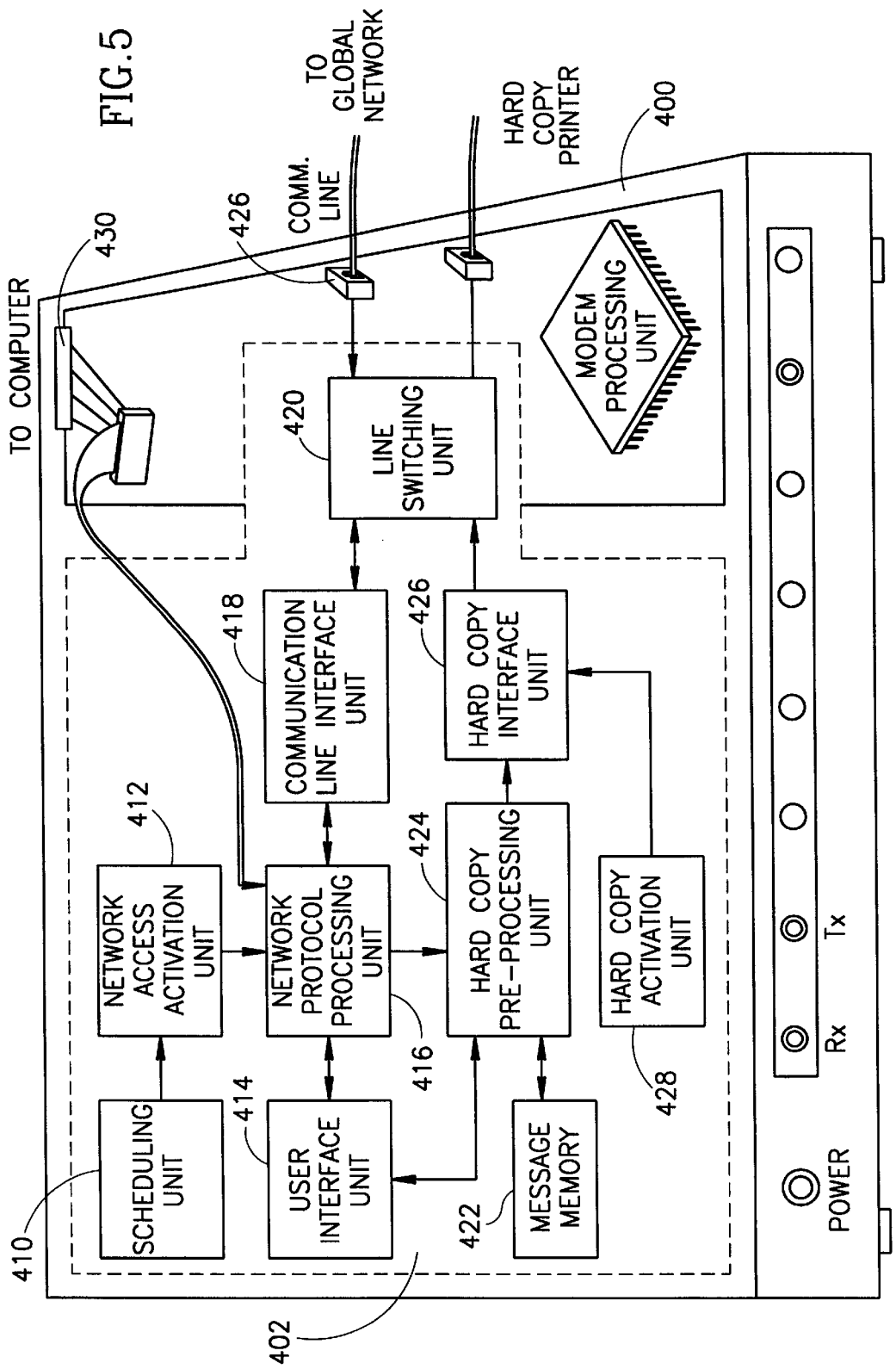
FIG. 5 is a simplified partially pictorial, partially block diagram illustration of a modem incorporating a network downloader subsystem in accordance with a preferred embodiment of the present invention.

Reference is now made to FIG. 5, which is a partially pictorial, partially block diagram illustration of a modem incorporating a network downloader subsystem in accordance with a preferred embodiment of the present invention. The system of FIG. 5 is preferably located within the housing 400 of a conventional modem, such as those manufactured and sold by Ricoh of Japan. Some of the circuitry of FIG. 1, collectively referred to as an automatic download circuit 402, is included within housing 400. Automatic download circuit typically includes a scheduling unit 410, a network access activation unit 412, a user interface unit 414, a network protocol processing unit 416, a communication line interface unit 418, a line switching unit 420, a message memory 422, a hard copy pre-processing unit 424, a hard copy interface unit 426 and a hard copy activation unit 428, whose functionality is similar to that described hereinabove in connection with FIG. 1 and is suitable for operation in the context of an otherwise conventional modem.

The hard copy output of the line switching unit 420 is preferably coupled to an external printer and the global network output of unit 420 may be connected in parallel with the conventional connection of the modem to a telephone line, via a conventional telephone line jack 426, forming part of the modem. The network protocol processing unit 416 is coupled to the computer port 430 of the modem.

Figure 6:
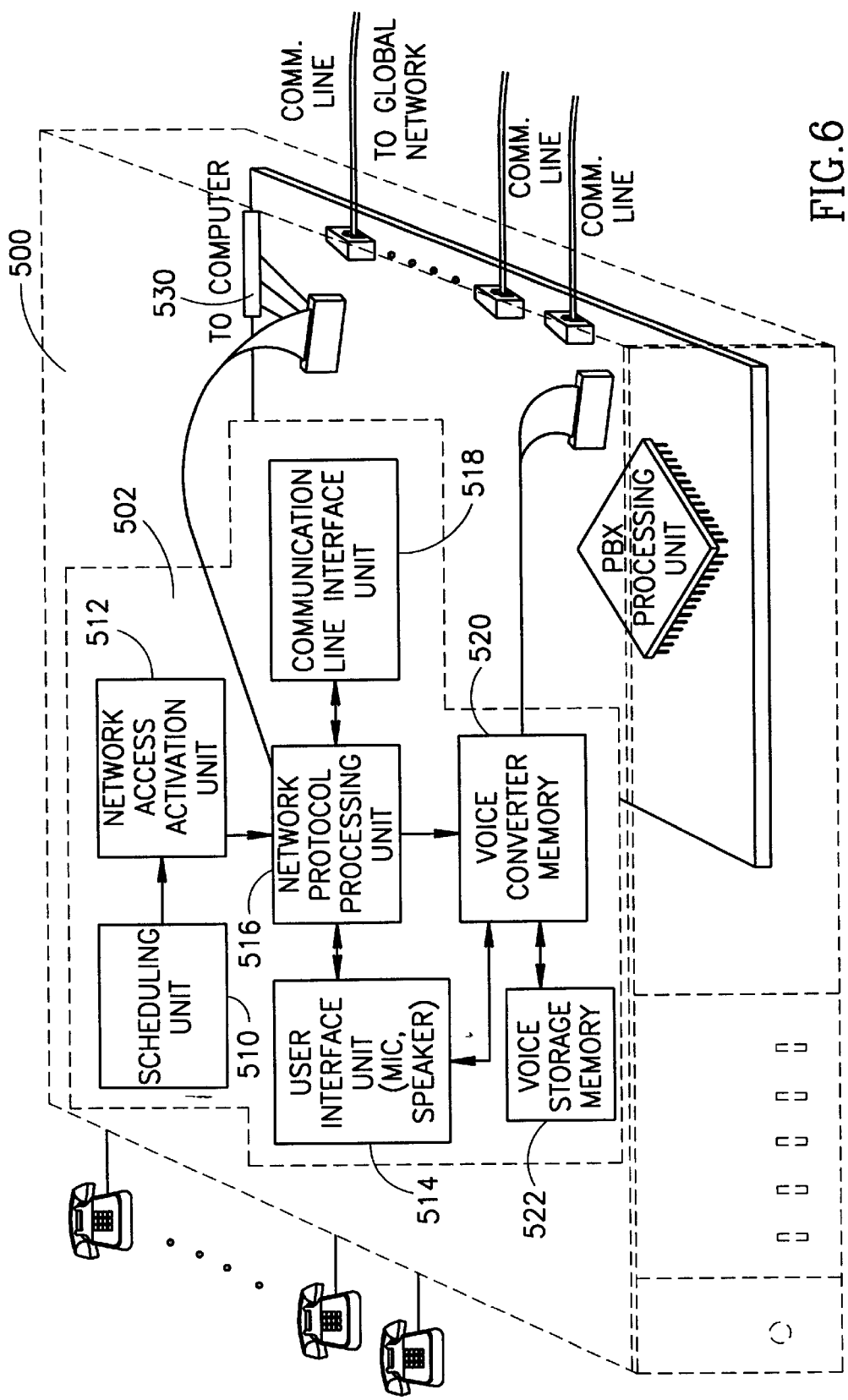
FIG. 6 is a simplified partially pictorial, partially block diagram illustration of PBX equipment incorporating an off-line voice message communicator constructed and operative in accordance with a preferred embodiment of the present invention.

Reference is now made to FIG. 6, which is a simplified partially pictorial, partially block diagram illustration of PBX equipment incorporating an off-line voice message communicator constructed and operative in accordance with a preferred embodiment of the present invention. Some of the circuitry of FIG. 3, collectively referred to as a message communicator 502, is included within a PBX housing 500.

Message communicator 502 typically includes a scheduling unit 510, a network access activation unit 512, a user interface unit 514 including a microphone and/or speaker, a network protocol processing unit 516 and a communication line interface unit 518, whose functionality is similar to that described hereinabove in connection with FIG. 3 and is suitable for operation in the context of an otherwise conventional PBX.

The message communicator 502 also preferably comprises a voice converter unit 520, which is coupled to the PBX circuitry, and a voice storage memory 522, which is coupled to unit 520.

The global network output of unit 518 may be connected in parallel with the conventional connection of the PBX via a telephone line to a global network. The network protocol processing unit 516 is coupled to the computer port 530 of the PBX.

Figure 7:
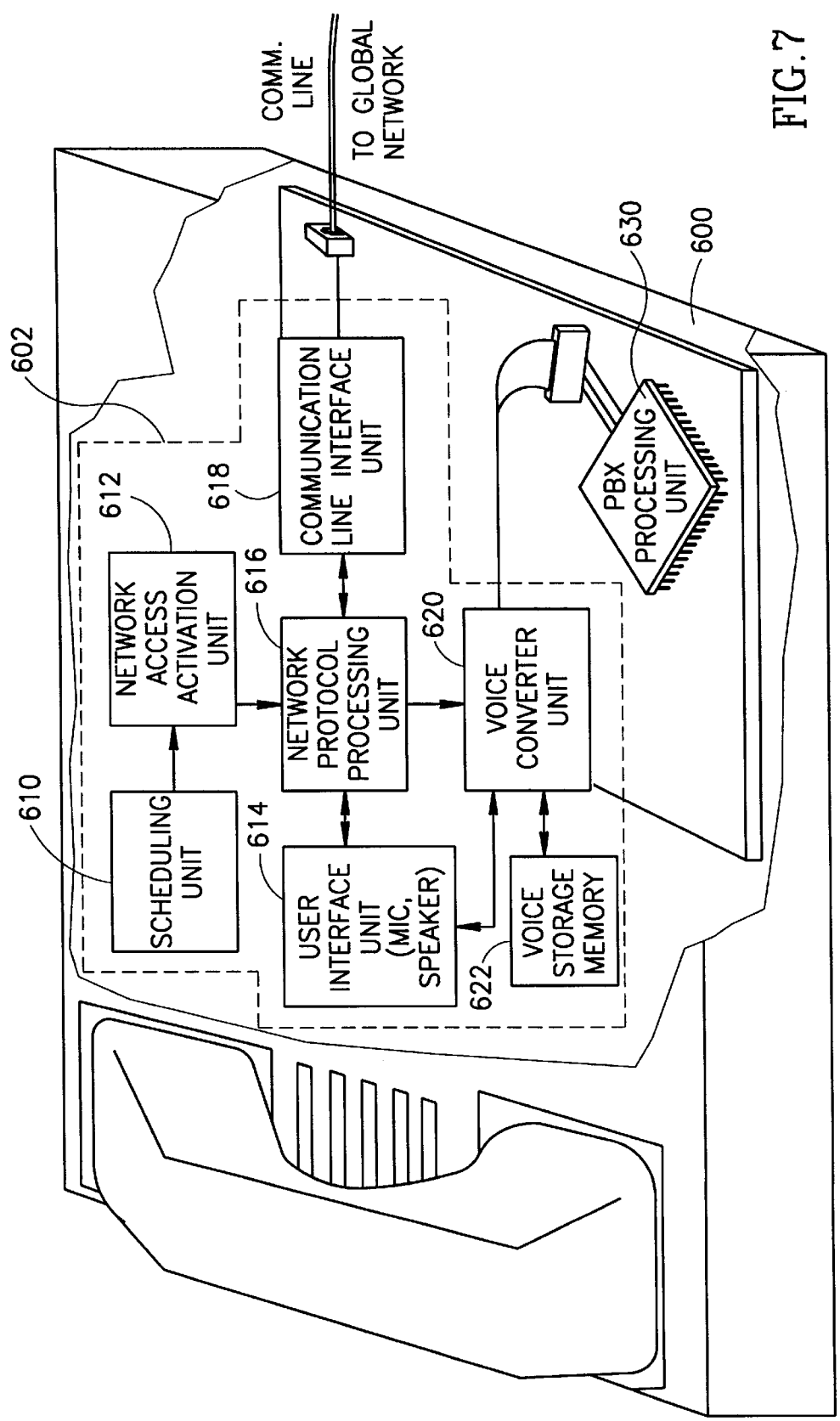
FIG. 7 is a simplified partially pictorial, partially block diagram illustration of a telephone incorporating an off-line voice message communicator constructed and operative in accordance with a preferred embodiment of the present invention.

Reference is now made to FIG. 7, which is a simplified partially pictorial, partially block diagram illustration of a telephone incorporating an off-line voice message communicator constructed and operative in accordance with a preferred embodiment of the present invention. Some of the circuitry of FIG. 3, collectively referred to as a message communicator 602, is included within a telephone housing 600.

Message communicator 602 typically includes a scheduling unit 610, a network access activation unit 612, a user interface unit 614 including a microphone and/or speaker, a network protocol processing unit 616 and a communication line interface unit 618, whose functionality is similar to that described hereinabove in connection with FIG. 3 and is suitable for operation in the context of an otherwise conventional telephone. Alternatively the microphone and/or speaker may be those which already exist in a conventional telephone.

The message communicator 602 also preferably comprises a voice converter unit 620 which is coupled to the telephone circuitry and a voice storage memory 622, which is coupled to unit 620.

The global network output of unit 618 may be connected in parallel with the conventional connection of the telephone via a telephone line to a global network. The voice converter unit 620 is also coupled to a telephone processing unit 630 of the telephone.

Figure 8:
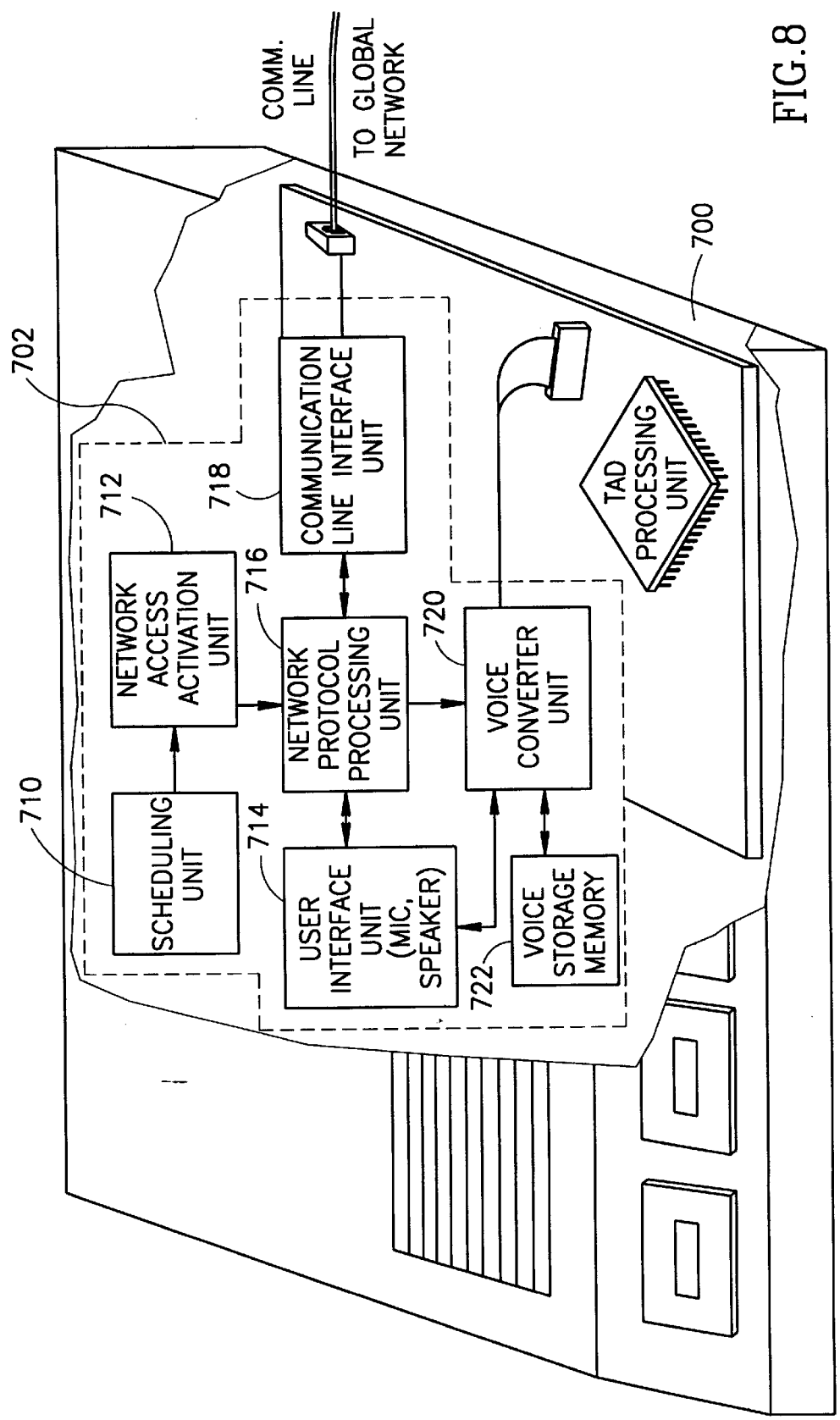
FIG. 8 is a simplified partially pictorial, partially block diagram illustration of a telephone answering device incorporating an off-line message communicator in accordance with a preferred embodiment of the present invention.

Reference is now made to FIG. 8, which is a simplified partially pictorial, partially block diagram illustration of a telephone answering device incorporating a network downloader subsystem in accordance with a preferred embodiment of the present invention. Some of the circuitry of FIG. 3, collectively referred to as a message communicator 702, is included within a telephone answering device housing 700.

Message communicator 702 typically includes a scheduling unit 710, a network access activation unit 712, a user interface unit 714 including a microphone and/or speaker, a network protocol processing unit 716 and a communication line interface unit 718, whose functionality is similar to that described hereinabove in connection with FIG. 3 and is suitable for operation in the context of an otherwise conventional telephone answering device.

The message communicator 702 also preferably comprises a voice converter unit 720, which is coupled to the telephone answering device circuitry, and a voice storage memory 722, which is coupled to unit 720.

The global network output of unit 718 may be connected in parallel with the conventional connection of the telephone answering device via a telephone line to a global network.

It will be appreciated by persons skilled in the art that the present invention is not limited by what has been particularly shown and described hereinabove. Rather the scope of the present invention is defined only by the claims which follow:

I claim:

1. A global network communicator for providing access solely to a global network comprising:

a global network application specific user interface;

a network access activation unit for initiating communication between the communicator and the global network and for initiating downloading of an incoming message from the global network;

a scheduling unit for automatically activating the network access activation unit at predetermined times;

a polling apparatus, operating in cooperation with the scheduling unit, for automatically polling the network to determine the presence of an incoming message for a user;

a network protocol processing unit operative for communication with the global network, for formatting data to a protocol employed by the global network and for translating received data from the global network to a format useful ultimately by a user in hard copy form; and a hard copy processing unit for automatically downloading an incoming message and outputting the incoming message via a hard copy interface port to a hard copy output device.

2. A global network communicator according to claim 1 further including a line switching unit connecting the communicator to either the global network or to the hard copy output device.

3. A global network communicator according to claim 1 wherein the hard copy output device comprises a facsimile machine.

4. A global network communicator according to claim 2 wherein the automatic polling includes establishing communication with the network via a predetermined service provider.

5. A global network communicator according to claim 1 wherein the scheduling unit automatically activates the network access activation unit at a predetermined frequency.

6. A global network communicator according to claim 2 further including a communication line interface interconnecting the network protocol processing unit to the global network and including logical and physical interface apparatus and modulation and demodulation apparatus for information transmitted to the global network and information received from the global network, respectively.

7. A global network communicator according to claim 2 further including a hard copy interface connected to the line switching unit and operative to provide a logical and physical interface to the hard copy output device.

8. A global network communicator according to claim 7 wherein the hard copy processing unit provides an information input to the hard copy interface and wherein the hard copy processing unit receives information directly from the network protocol processing unit.

9. A method of providing access solely to a global network comprising the steps of:

provforming a global network application specific user interface;

initiating communication with the global network at predetermined times;

formatting data to a protocol employed by the global network;

automatically polling the network to determine the presence of an incoming message for a user;

automatically downloading an incoming message from the global network;

translating the downloaded message from the global network to a format useful ultimately by a user in hard copy form;

outputting the downloaded message via a hard copy interface port to a hard copy output device.

10. A method according to claim 9 wherein the automatic polling step further includes the step of establishing communication with the network via a predetermined service provider.

11. A method according to claim 10 wherein the hard copy output device comprises a facsimile machine.

12. An apparatus for providing off-line communication of voice messages over a global network comprising:

a global network application-specific user interface including a voice transducer;

a voice-data converter for converting between analog voice signals associated with the transducer and digital voice data;

a network access activation unit for initiating off-line communication between the communicator and the global network and for initiating off-line downloading of an incoming message from the global network;

a scheduling unit for automatically activating the network access activation unit at predetermined times;

a polling apparatus, operating in cooperation with the scheduling unit, for automatically polling the network to determine the presence of an incoming message for a user; and a network protocol processing unit, operative for communication with the global network, for formatting data to a protocol employed by the global network, for translating received data from the global network to a format useful ultimately by a user, and for providing automatic off-line downloading of an incoming message to a voice storage memory, wherein the downloaded message is provided to the user interface via the voice-data converter.

13. An apparatus according to claim 12 wherein the automatic polling includes establishing communication with the network via a predetermined service provider.

14. An apparatus according to claim 12 wherein the scheduling unit automatically activates the network access activation unit at a predetermined frequency.

15. A method for providing off-line communication of voice messages over a global network comprising:

providing a global network application-specific user interface including a voice transducer;

converting between analog voice signals associated with the user interface and digital voice data;

automatically initiating off-line communication with the global network at predetermined times;

automatically polling the network to determine the presence of an incoming voice message for a user;

translating incoming voice message data from the global network to a format useful ultimately by a user;

providing automatic off-line downloading of the translated incoming voice message from the global network to a voice storage memory; and providing the downloaded message to the user interface in accordance with the converting step.

16. A method according to claim 15 wherein the automatic polling step includes establishing communication with the network via a predetermined service provider.

17. A facsimile machine incorporating a global network communicator comprising:

facsimile processor for processing incoming facsimile messages and outgoing facsimile messages;

a hard copy output device;

a network access activation unit for initiating communication between the facsimile machine and the global network and for initiating downloading of an incoming facsimile message from the global network;

a scheduling unit for automatically activating the network access activation unit at predetermined times;

a polling apparatus, operating in cooperation with the scheduling unit, for automatically polling the network to determine the presence of an incoming facsimile message;

a network protocol processing unit operative for communication with the global network, for formatting data to a protocol employed by the global network and for translating received facsimile data from the global network to a format used by the facsimile processor; and a hard copy processing unit for automatically downloading an incoming facsimile message and outputting the incoming facsimile message via the facsimile processing board to the hard copy output device.

18. A facsimile machine according to claim 17 wherein the scheduling unit automatically activates the network access activation unit at a predetermined frequency.

19. A facsimile machine according to claim 18 wherein the automatic polling includes establishing communication with the network via a predetermined service provider.

* * * * *